United States Patent [19]
Kumagai

[11] Patent Number: 5,146,549
[45] Date of Patent: Sep. 8, 1992

[54] METHOD AND APPARATUS FOR IDENTIFYING A PAIR OF GROUPS IN AN IMAGE HAVING A MINIMUM SEPARATION DISTANCE

[75] Inventor: Ryohei Kumagai, Tokyo, Japan
[73] Assignee: Ezel, Inc., Tokyo, Japan
[21] Appl. No.: 711,493
[22] Filed: Jun. 4, 1991

Related U.S. Application Data

[63] Continuation of Ser. No. 331,361, Mar. 31, 1989, abandoned.

[30] Foreign Application Priority Data

Apr. 11, 1988 [JP] Japan .................. 63-88483

[51] Int. Cl.⁵ .................................. G06F 15/20
[52] U.S. Cl. ................................... 395/138
[58] Field of Search ............. 364/518, 521; 395/133, 395/138, 139

[56] References Cited

U.S. PATENT DOCUMENTS 4,706,213  11/1987  Bandai .................. 395/138
4,837,563   6/1989  Mansfield et al. ........ 395/138

OTHER PUBLICATIONS

Fred C. Billingsley, Digital Image Processing For Information Extraction, Int. J. Machine Perception of Patterns and Pictures, Inst. Physics, pp. 337–362, 1972.

*Primary Examiner*—Heather R. Herndon
*Attorney, Agent, or Firm*—Cushman, Darby & Cushman

[57] ABSTRACT

A method and apparatus for determining which pair of a plurality of objects in an image has a minimum separation distance. In the method, centroids of groups are ordered in a sequence according to X and Y coordinates. A distance is measured between a reference object and an object adjacent in the ordered sequence to the reference. Objects in the sequence which are not adjacent in the sequence to the reference are excluded from measurement based upon relationships between the coordinate values of the reference object, the adjacent object and the non adjacent object being evaluated for exclusion. This exclusion reduces the total number of steps necessary to determine which pair of objects has the minimum distance. Distance measurements are made to non-excluded objects. Similar steps are repeated for other reference objects. The pair objects which have the smallest measured distance are indicated as the objects having the minimum separation. In the apparatus, the image is stored in a frame memory and an index indicating the centroid of the group may also be stored. The memory may be read in a raster scan order, thus generating an ordered sequence of centroid locations.

15 Claims, 2 Drawing Sheets

FIG. 3

| $y_1$ | $x_1$ |
| $y_2$ | $x_2$ |
| $y_3$ | $x_3$ |
| ⋮ | ⋮ |
| $y_n$ | $x_n$ |

FIG. 4

| $y_k$ | $x_k$ | Standard Group |
| $y_{k+1}$ | $x_{k+1}$ | |
| $y_{k+2}$ | $x_{k+2}$ | |
| $y_{k+3}$ | $x_{k+3}$ | |
| $y_{k+4}$ | $x_{k+4}$ | |
| $y_{k+5}$ | $x_{k+5}$ | |
| $y_{k+6}$ | $x_{k+6}$ | |

METHOD AND APPARATUS FOR IDENTIFYING A PAIR OF GROUPS IN AN IMAGE HAVING A MINIMUM SEPARATION DISTANCE

This is a continuation of application Ser. No. 07/331,361, filed on Mar. 31, 1989, which was abandoned.

FIELD OF THE INVENTION

The present invention relates to an image processing method for calculating the minimum distance between centroids of groups in an image, that is, the distance of the nearest centroids.

BACKGROUND OF THE INVENTION

For example, as for images of a metal, it often happens that the minimum distances between centroids of groups in various organizations differ from one another. Therefore it is important to calculate the minimum distance so as to find the boundary between different organizations.

It does not seem that an effective conventional method to calculate the minimum distance is published. In the case that the minimum distance is calculated by self-obvious method, it is necessary to calculate all of the centroid distances of each couple of groups, and moreover to find the minimum value among them. The number of distance calculations to find the minimum, it is:

$$N \times N(N-1)/2N^3$$

and as the number of groups increases, the calculation time grows.

SUMMARY OF THE INVENTION

The present invention has an object to provide an image processing method for efficiently calculating the minimum distance between centroids.

The image processing method according to the present invention is based on the recognition that the pair of centroids which have the minimum distance have closest value(s) of x-coordinate and/or y-coordinate with each other. An index for indicating the centroid of each group in an image is registered at the place of each centroid in a frame memory, coordinates and y-coordinates of the centroid are registered in a table in the raster order, centroid distances are calculated from adjacent pairs in this table to more remote couples, and distance calculations for couples which do not have small differences between x-coordinates or y-coordinates are neglected.

BRIEF DESCRIPTION OF THE DRAWINGS

FIGS. 2 to 4 show an embodiment of an image processing method according to the present invention, that is;

FIG. 2 shows centroids in an image;

FIG. 3 shows a table of x- and y-coordinates of the centroids;

FIG. 4 shows more the table in FIG. 3 in more detail.

DETAILED DESCRIPTION OF THE PREFERRED EMBODIMENT

Exemplary preferred embodiments of the image processing method according to the present invention will be described in detail hereinafter.

Figure 1:
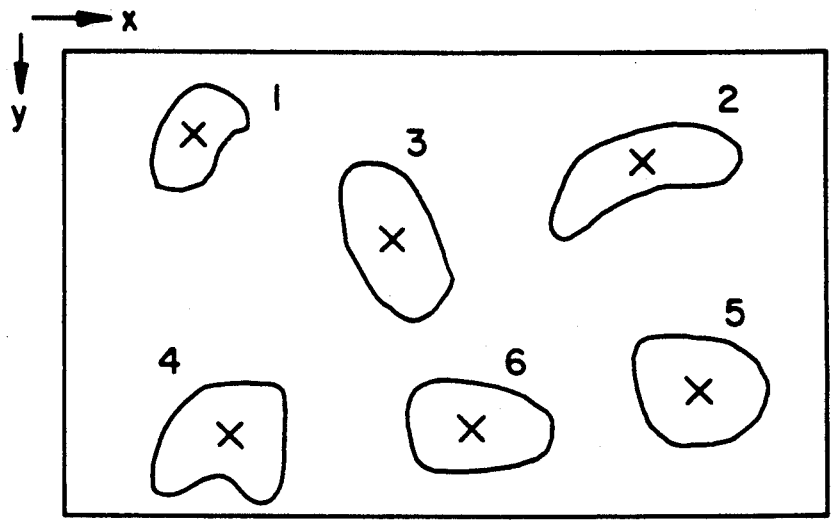
FIG. 1 shows an image to be processed.
Figure 2:
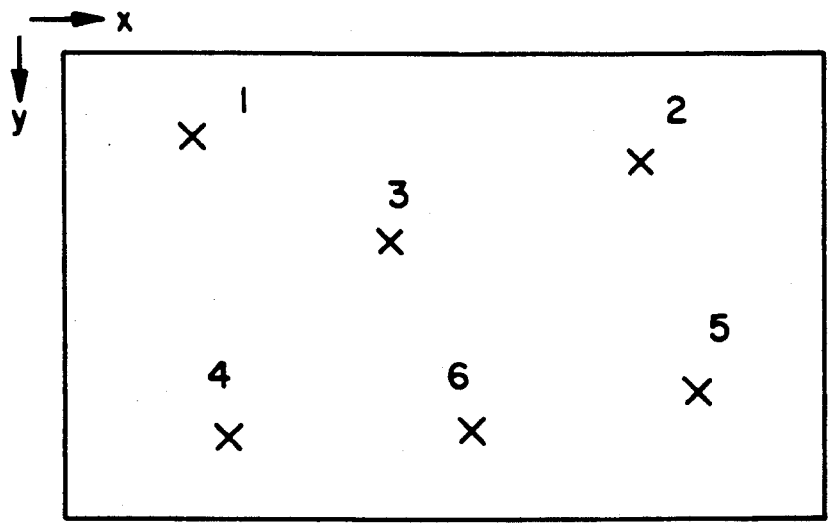

When centroids of groups are calculated (there are 6 groups from No. 1 to No. 6 in FIG. 1: the X marks are centroids of each group), an image including indexes for indicating centroids is generated. Their index may be the labeling numbers of each group. FIG. 2 shows extracted centroids in the image of FIG. 1. The image is stored in a frame memory and data in the frame memory are read out in the raster order in high speed.

Simultaneously with the read-out, x-coordinates and y-coordinates of indexed pixels, are written in a table in the order of indexes found, that is, in the raster order.

The table is generated as shown in FIG. 3 in which pairs of y-coordinate and x-coordinate are registered in series. As shown in FIG. 1 and FIG. 2, when the origin of the coordinate axes is on the upper left corner, the downward direction is the y-direction and the rightward direction is the x-direction, the y-coordinate train is arranged so as to increase monotonously, and x-coordinate train is arranged so as to increase monotonously in each group of the same y-coordinate.

The distances between the nearest centroids can be defined for each group, taking each group as a reference group one by one from which centroid distances to other groups are calculated. The centroid distances are calculated sequentially between the reference group and the other groups in order from the nearest to the most remote one. "Nearest" means the order on the table is the nearest, therefore, as for the coordinate system above, centroid distance is calculated sequentially from the one whose value of y-coordinate is the same as or the nearest to the centroid of the reference group.

As shown in FIG. 4, when the group whose centroid coordinate is $(x_k, y_k)$ is the reference group, the centroid distances to other groups may be evaluated in increasing order or decreasing order. Here the increasing order is applied. First the centroid distance $d_{k,k+1}$ between the reference group and the next group is calculated as follows;

$$d_{k,k+1} = (x_k - x_{k+1})^2 + (y_k - y_{k+1})^2 \quad (1)$$

Next the centroid coordinate $(x_{k+2}, y_{k+2})$ of next group is evaluated and the value of the coordinates of $x_k$, $x_{k+1}$, $x_{k+2}$ are compared. Then, if the values are $$x_k >= x_{k+1} >= x_{k+2} \quad (2)$$

or $$x_k <= x_{k+1} <= x_{k+2} \quad (3)$$

the values of $d_{k,k+1}$ and $d_{k,k+2}$ are always $$d_{k,k+1} <= d_{k,k+2}$$

Therefore the calculation of $d_{k,k+2}$ is omitted and the value of next group is evaluated.

In this way, by omitting complex calculations as many times as possible, the process becomes efficient.

If the condition of (2), (3) or both of them are not satisfied, $d_{k,k+2}$ is calculated and the smaller one between $d_{k,k+1}$ and $d_{k,k+2}$ is registered.

Thereafter $(x_{k+3}, y_{k+3})$, $(x_{k+4}, y_{k+4})$, ..., are evaluated in the same manner as the above, that is, evaluation by the conditions (2) and (3) and minimal times distance calculations are performed; finally the minimal value of distance is registered.

After the evaluation in increasing order, the evaluation in decreasing order is performed. As for the evaluation in decreasing order, the condition formulas (4) and (5) are applied instead of the above conditions (2) and (3).

$$x_k >= x_{k-1} >= x_{k-2} \quad (4)$$

$$x_k <= x_{k-1} <= x_{k-2} \quad (5)$$

When the evaluation in decreasing order is started, the minimum distance (hereafter it is called $d_{u,min}$) obtained by the evaluation in increasing order is used as a reference distance. When a distance $d_{k,k-1}$ is $$d_{k,k-1} >= d_{u,min}$$

, the groups which do not satisfy the conditions (4) or (5) are evaluated by comparing their distances with $d_{u,min}$, then, the minimal distance is finally registered and the following evaluation is performed.

In this case, the evaluations are performed from increasing order to decreasing order, however the same result will be obtained by the evaluation in reverse sequence.

In the process above, when the number of groups is N, the number of distance calculations is much fewer than $(N-1)$, and only the evaluations by the condition formulas are $(N-1)$ times. Therefore the number of calculation times decreases as compared to the conventional method, and as the number of groups becomes large, the efficiency of the present invention becomes conspicuous.

Incidentally, x-coordinate and y-coordinate can be chosen arbitrarily. The table may be generated according to any data order as long as the order is based on the raster order.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this invention as defined in the following claims.

What is claimed is:

1. A method for transforming an original image into a modified image comprising steps of:
   generating a first representation of the original image in a frame memory;
   generating a second representation of the image in a frame memory, said second representation including indices stored in frame memory locations corresponding to coordinates of centroids of groups in the original image;
   generating a table of x- and y-coordinates of centroids of groups in the image, said table organized in order of centroid coordinates;
   excluding particular pairs of groups from further processing based on relative locations of coordinates of group centroids in the table;
   measuring distances between centroids of non-excluded pairs of groups; and
   generating a representation of the original image indicating which pair of groups in the image have the minimum measured distance between centroids.

2. An image processing method according to claim 1, wherein the step of generating a table includes a step of registering an index for each centroid at a place of each centroid in a frame memory.

3. An image processing method according to claim 1, wherein the step of generating a table includes a step of arranging centroid locations in said table in raster order.

4. An image processing method according to claim 1, wherein said step of calculating distances is performed first with respect to an entry adjacent to a reference entry in the table and then in order of increasing separation in the table from a reference.

5. A method for transforming an original image into a modified image comprising steps of:
   generating a first representation of the original image in a frame memory;
   generating a second representation of the image in a frame memory, said second representation including indices stored in frame memory locations corresponding to coordinates of centroids of groups in the original image;
   generating an ordered sequence of coordinates of centroids of objects in the image;
   measuring a separation distance between a first reference object and an object which is adjacent to the first reference object in the ordered sequence;
   excluding from further processing with respect to the first reference object an object which is not adjacent to the first reference object in the ordered sequence when a coordinate value of the non-adjacent object centroid and a coordinate value of the adjacent object centroid satisfy a predetermined condition;
   measuring a separation distance between the first-reference-object centroid and the centroid of a non-excluded object;
   generating a representation of the original image indicating the first reference object and the object having the smallest measured distance to the first reference object as the pair having the minimum separation distance.

6. A method as in claim 5 further comprising steps of:
   measuring a separation distance between a second reference object and an object which is adjacent to the second reference object in the ordered sequence;
   excluding a non-adjacent object from further processing with respect to the second reference object when a coordinate value of the non-adjacent object centroid and a coordinate value of the second adjacent reference object centroid satisfy a predetermined condition;
   measuring a separation distance between the second-reference-object centroid and centroids of non-excluded objects; and
   indicating, as the object pair having the minimum separation distance, the reference object and corresponding other object for which the measured separation distance is a minimum.

7. A method as in claim 5 wherein the coordinates are of a cartesian coordinate system having a first axis, X and a second axis, Y.

8. A method as in claim 7 wherein the step of generating an ordered sequence includes a step of ordering the locations of object centroids in order of their Y coordinate values.

9. A method as in claim 8 wherein the step of generating an ordered sequence includes a step of further ordering the locations of object centroids having the same Y coordinate values in order of their X coordinate values.

10. A method as in claim 8 wherein the step of excluding an object from further processing includes a step of comparing the X coordinate value of the reference object, $X_K$, the X coordinate value of the adjacent object, $X_{K+1}$, and the X coordinate value of a non-adjacent object, $X_{K+2}$.

11. A method as in claim 10 wherein the step of excluding a non-adjacent object includes a step of excluding a non-adjacent object from further processing with respect to the first reference object when $X_K \geq X_{K+1} \geq X_{K+2}$.

12. A method as in claim 10 wherein the step of excluding a non-adjacent object includes a step of excluding a non-adjacent object from further processing with respect to the first reference object when $X_K \leq X_{K+1} \leq X_{K+2}$.

13. A method as in claim 5 further comprising steps of measuring separation distance between the first-reference-object centroid and a plurality of centroids of non-excluded objects.

14. A method as in claim 13 wherein the steps of measuring separation distance are performed with respect to non-adjacent objects in order of increasing separation of the non-adjacent objects from the first reference object in the ordered sequence.

15. A method for transforming an original image into a modified image comprising steps of:

generating a first representation of the original image in a frame memory;

generating a second representation of the image in a frame memory, said second representation including indices stored in frame memory locations representing coordinates of centroids of groups in the original image;

generating a table of x- and y-coordinates of centroids of groups, said table organized in order of centroid coordinates:

excluding particular pairs of groups from further processing based on relative location of coordinates of group centroids in the table;

measuring distances between centroids of non-excluded pairs of groups; and generating a representation of the original image designating a pair of groups in the original image having the minimum measured distance between centroids.

* * * * *